United States Patent
Jackson et al.

(10) Patent No.: US 6,173,318 B1
(45) Date of Patent: *Jan. 9, 2001

(54) METHOD AND APPARATUS FOR PRE-FETCHING DATA FOR AN APPLICATION USING A WINSOCK CLIENT LAYERED SERVICE PROVIDER AND A TRANSPARENT PROXY

(75) Inventors: Jeffrey R. Jackson, Forest Grove; Scott B. Blum, Beaverton, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/991,657

(22) Filed: Dec. 16, 1997

(51) Int. Cl.[7] .................................................. G06F 15/16
(52) U.S. Cl. .......................... 709/219; 709/203; 709/218; 710/52; 710/58
(58) Field of Search ....................................... 709/218, 217, 709/203; 710/58, 52

(56) References Cited

U.S. PATENT DOCUMENTS

| | | | | |
|---|---|---|---|---|
| 5,687,347 | * | 11/1997 | Omura et al. | 711/112 |
| 5,727,129 | * | 3/1998 | Barrett et al. | 706/10 |
| 5,802,292 | * | 9/1998 | Mogul | 709/203 |
| 5,892,914 | * | 4/1999 | Pitts | 710/56 |
| 5,978,841 | * | 11/1999 | Berger | 709/217 |
| 6,038,601 | * | 3/2000 | Lambert et al. | 709/226 |
| 6,067,565 | * | 5/2000 | Horvitz | 709/218 |

* cited by examiner

Primary Examiner—Kenneth S. Kim
(74) Attorney, Agent, or Firm—Kenyon & Kenyon

(57) ABSTRACT

Response time is improved by a method and apparatus for pre-fetching application data over a network. A request for application data, such as Internet data, is received. The request is transmitted to a transparent network proxy, which issues requests over a communications network to fetch the requested data. The requested application data are received by the proxy and forwarded to a client layered service provider, which supplies the data to the application. If additional application data is received by the proxy, that data is also forwarded to the client layered service provider, where it is stored as pre-fetch data. If additional application data is requested by the application, the additional data can be supplied from the stored pre-fetch data, if available.

20 Claims, 5 Drawing Sheets

METHOD AND APPARATUS FOR PRE-FETCHING DATA FOR AN APPLICATION USING A WINSOCK CLIENT LAYERED SERVICE PROVIDER AND A TRANSPARENT PROXY

OF THE INVENTION

The invention relates to requesting data over a network. More particularly, the invention relates to a method and apparatus for pre-fetching data with a transparent proxy.

BACKGROUND OF THE INVENTION

A computer network is a group of computers, such as Personal Computers (PCs), interconnected by communication paths. One advantage of creating a PC network is that a peripheral on one PC, such as a modem connected to the Internet, can be used by other PCs in the network. This typically requires that a "proxy" application reside on the PC connected to the Internet, or the "server" PC. The proxy handles requests for Internet information from the other PCs in the network, or "client" PCs. Such a network avoids the cost of purchasing a second modem, as well as the cost of installing and maintaining a second telephone line.

It can be difficult, however, to configure this network to allow the client PCs to access the modem. This is especially true for the average consumer who is not familiar with the software and hardware mechanics underlying a PC network. One problem is configuring the application program that accesses the Internet, such as Netscape Navigator version 2.01 available from Netscape Communications Corporation in Mountain View, Calif., to recognize that a proxy is being used. Another problem is that some applications are not "proxy aware," that is, they are not even capable of being configured to use a proxy at all. These difficulties are avoided with the use of a proxy that does not require an application program to be specially configured, also referred to as a "transparent" proxy.

Because a request for Internet data must first pass through the network, including through the proxy or transparent proxy, the delay before the Internet data is transferred, or "latency" of the system, is increased. Moreover, after the data is obtained from the Internet it must be sent back through the proxy to the application. This also increases the latency of the system.

The increased latency creates a problem when certain multimedia applications are used, such as RealAudio available from RealNetworks, Inc. in Seattle, Wash. An application such as RealAudio plays sound received, or "streamed," over the Internet in real time. This type of application requires that a large number of small data packets be quickly transferred to the PC from the Internet. Each of these small packets are separately transferred and each would incur the increased latency described above. As a result, the performance of an application such as RealAudio on a network is degraded and can even be unusable. A similar problem occurs when moving pictures are displayed with an application such as RealVideo, also available from RealNetworks, Inc. Other multimedia applications, such as "Internet telephone" software programs, are also sensitive to increased system latencies.

In view of the foregoing, it can be appreciated that a substantial need exists for a method and apparatus for obtaining data over a network that reduces the latencies caused by a proxy, and solving the above-discussed problems.

SUMMARY OF THE INVENTION

A request for application data is received. The requested application data and pre-fetch data for an application that was not requested by the application are requested over the network from a proxy.

DETAILED DESCRIPTION

Figure 1:
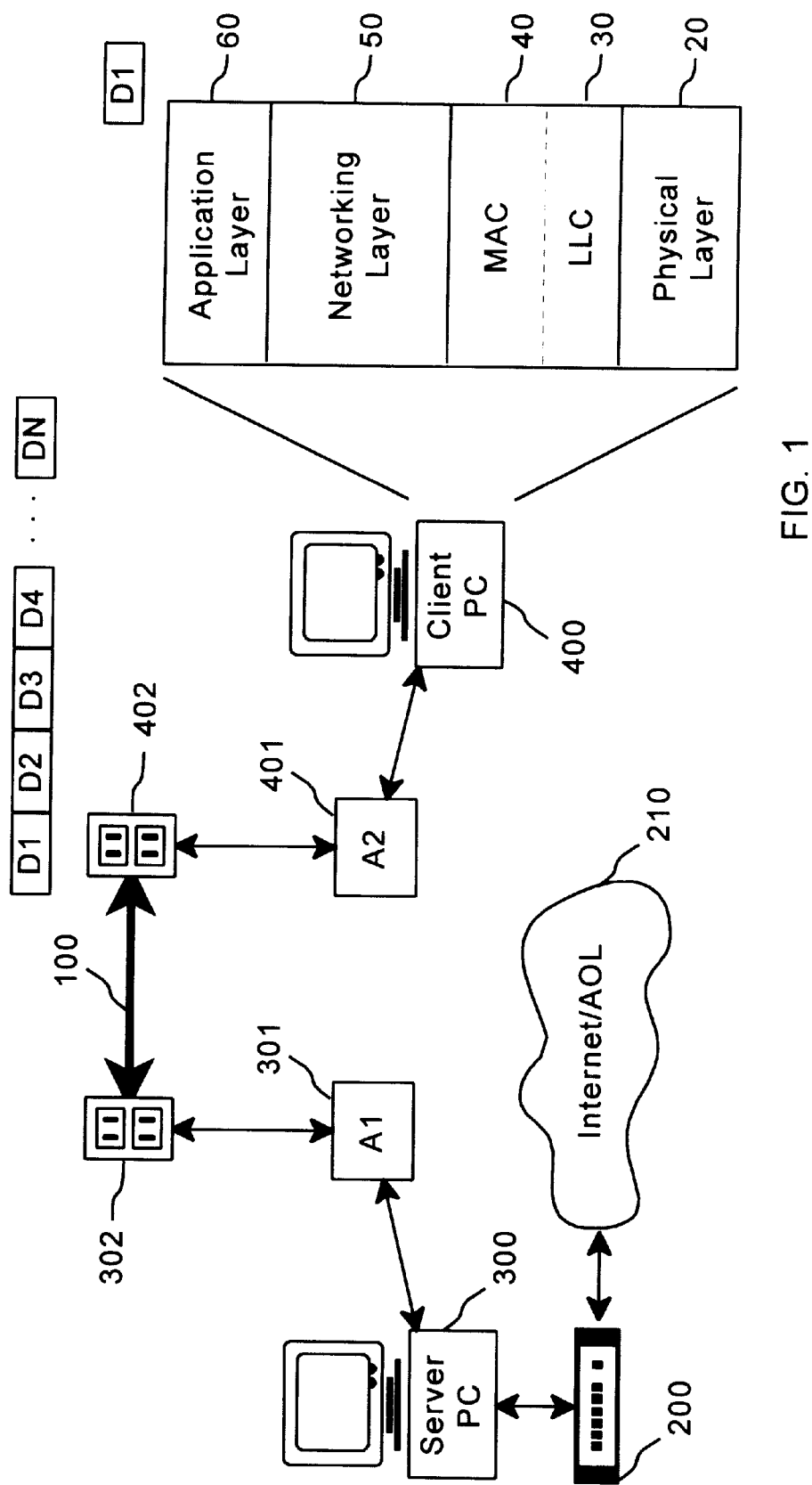
FIG. 1 is a block diagram of a system, including a computer network, suitable for practicing an embodiment of the present invention.

The present invention includes embodiments of a method and apparatus for pre-fetching data with a transparent proxy. Referring now in detail to the drawings wherein like parts are designated by like reference numerals throughout, there is illustrated in FIG. 1 a block diagram of a system, including a computer network, suitable for practicing an embodiment of the present invention. FIG. 1 shows a server PC 300 connected to an external communications network 210 through a modem 200. The external communications network 210 can be any type of network, such as America On Line (AOL), but the Internet will be used herein when describing the present invention. The server PC 300 also communicates over an AC power line 100, through an adapter 301 plugged into an AC outlet 302, with a client PC 400 having an adapter 401 plugged into an AC outlet 402.

The server PC 300 and the client PC 400 could be, for example, PCs having one of the Pentium®, Pentium®, Pro or Pentium® II family of microprocessors available from Intel Corporation, or their equivalents, running Windows NT or Windows 95 or higher available from Microsoft Corporation. By communicating over the AC power line 100, the server PC 300 and the client PC 400 form a network. Although FIG. 1 shows two PCs 300, 400 in the network, any number of PCs can be included. Moreover, although an AC power line 100 is shown, any type of communication path between the PCs could be used instead.

The relevant functional layering of the client PC's communications system includes the application layer 60, such as Netscape or RealAudio, which lets a user at the client PC 400 interface with the network. The networking layer 50, generally part of an Operating System (OS) such as Windows 95, available from Microsoft Corporation in Redmond, Wash., handles the routing of the data in the network. For example, the networking layer 50 makes sure that a request for Internet data from the application layer 60 is sent to the server PC 300. The Media Access Control (MAC) layer 40 and the Logical Link Control (LLC) layer 30 provide error control and synchronization for the physical layer 20, which conveys data in the network at the electrical and mechanical level. In general, the MAC layer 40 and LLC layer 30 assure that an initial connection in the network has been set up, divide output data into data frames, and handle acknowledgments from other PCs that information has arrived successfully. These layers also ensure that incoming data has been received successfully. Layers similar to those described above are present in the server PC 300, but are not shown in FIG. 1.

According to an embodiment of the present invention, an application running in the application layer 60 of the client PC 400 can request a packet of Internet data D1. With the use of the pre-fetching scheme described in detail with respect to FIGS. 2 to 5, in response to this request for data D1, data D1 to Dn is requested by the client PC 400, and obtained from the Internet 210 by the server PC 300, using the transparent proxy. The data D1 is provided to the application and the data D2 to Dn are stored in a cache. When the application asks for another packet of data, such as data D2, the data can quickly be given to the application because it has already been obtained from the Internet 210 and stored in the cache. This reduces the latencies in the system using the transparent proxy.

Figure 2:
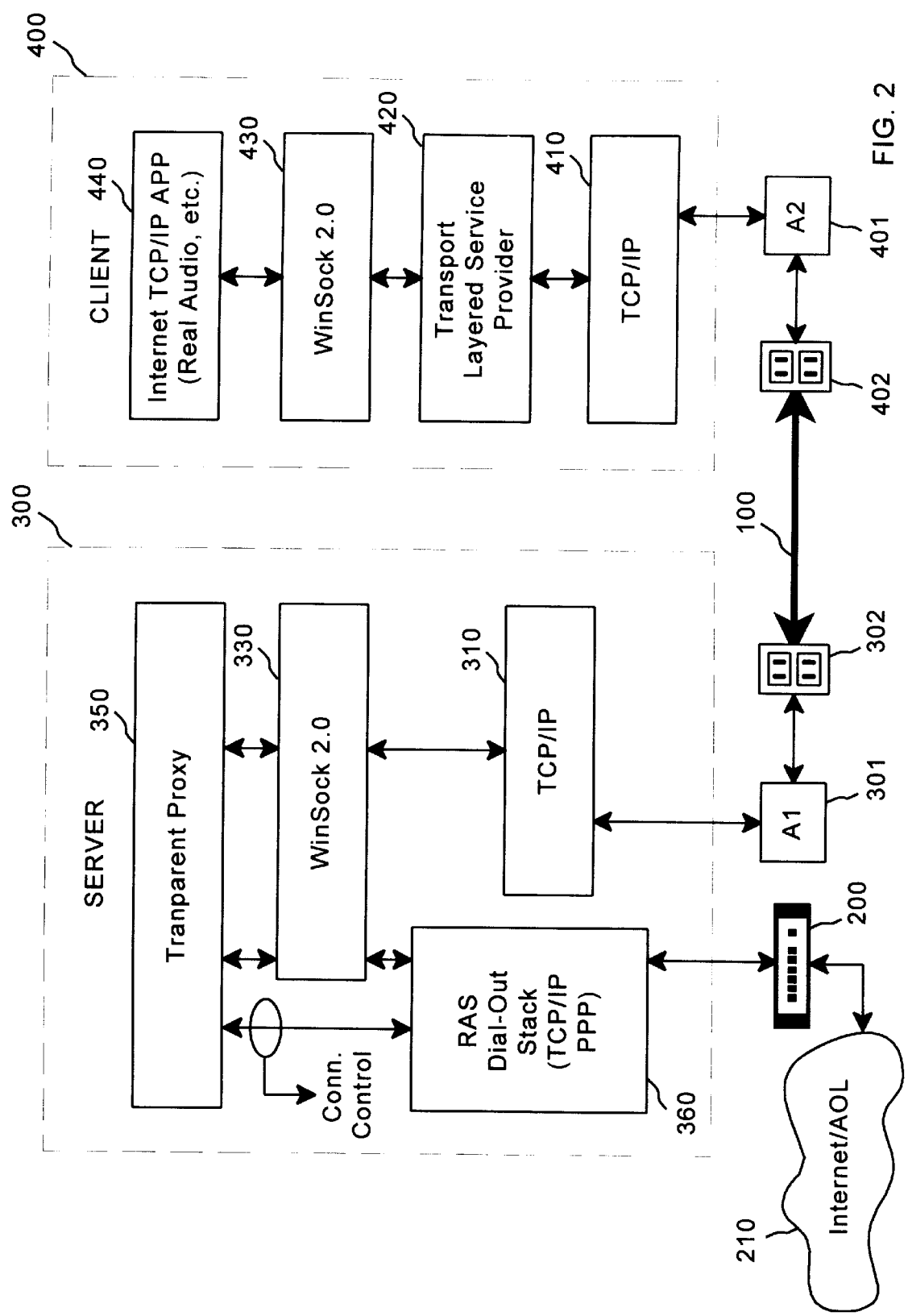
FIG. 2 is a block diagram of a software architecture of a system, including a server computer and a client computer, suitable for practicing an embodiment of the invention.

FIG. 2 is a block diagram of a software architecture of a system, including a server PC 300 and a client PC 400, suitable for practicing an embodiment of the invention. The server PC 300 is connected to the Internet 210 through a modem 200 and communicates, over an AC power line 100 through an adapter 301 plugged into an AC outlet 302, with the client PC 400 through an adapter 401 plugged into an AC outlet 402 to create a network.

An Internet Transmission Control Protocol/Internet Protocol (TCP/IP) application program 440, such as RealAudio, can reside in the client PC 400. The client PC 400 can also include a Windows 95 or Windows NT OS with a WinSock version 2.0 TCP/IP stack 430. WinSock is an Application Programming Interface (API) and associated Dynamic Link Libraries (DLLs) that contain the information and procedures used by a Windows OS to handle input and output requests for a TCP/IP application. Although 2.0 is the latest version of WinSock available at the time of invention, future versions of WinSock may also be used in accordance with an embodiment of the invention.

The application 440 can request a packet of Internet data D1 through the WinSock interface 430. As used herein, the term Layered Service Provider (LSP) will be understood to include both a name space service provider and a transport service provider. A LSP 420 intercepts the request and converts it into a request for data D1 to Dn. That is, the LSP 420 can request data in addition to the data requested by the application 440. The request for data D1 to Dn is sent over the network through a TCP/IP transport service provider 410.

The request for data D1 to Dn is received by a transparent proxy application 350 through a TCP/IP transport service provider 310. The transparent proxy application 350 retrieves the data D1 to Dn from the Internet 210 through a Remote Access Server (RAS) dial-out stack 360.

The data D1 to Dn are returned to the LSP 420 of the client PC 400, which supplies the application 440 with the requested data D1 and stores data D2 to Dn in a cache. When the application 440 requests data D2, the data can be quickly retrieved from the cache without the added latency caused by the transparent proxy 350.

Thus, latencies are minimized because the data can be moved to the LSP 420 as soon as it arrives at the transparent proxy application 350. When the application 440 requests the data, the data is available locally in the LSP 420 and there is no need to post a request to the proxy 350.

The pre-fetching is implemented as a portion of the WinSock transport LSP 420, which requests data from the proxy 350 as soon as possible after arrival of the data. The LSP 420 is a portion of WinSock that resides between the client application 440 and the TCP/IP interface 410. The LSP 420 intercepts all transport requests from the application 440 and reacts accordingly. The objective is such that the data streaming into the proxy 350 will be present locally whenever the client application 440 requests it. This reduces the time from which the client application 440 issues a request for data and subsequently receives that data, or a notification that the data is unavailable at this time.

Without pre-fetching, data would only be retrieved from the proxy 350 whenever the application 440 explicitly requested it. Every data request would be sent to the proxy 350, the data pulled up from the transport stack 360, and transferred back to the LSP 420 and returned to the application 440. This round trip associated with each data request degrades the performance of time sensitive applications that issue large numbers of requests for small sized amounts of data. In theses cases, the amount of time spent transferring each request dominates the amount of time spent actually retrieving the data.

In one embodiment of the present invention, as soon as data arrives at the proxy 350 a notification is sent to the LSP 420. Even though the application has not requested the data, the LSP 420 will request that it be transferred. The data is then placed in a local cache until the data is requested by the application 440. With this "pre-fetching," the application 440 receives the data in a timely manner and is free to perform other tasks until it requires the next packet of data.

It is possible that data will arrive faster than it can be requested and transferred between the proxy 350 and LSP 420 on a packet-by-packet basis. If so, a request from the LSP 420 to transfer data for the cache could find multiple packets available for caching. All available packets that will fit into the cache can be sent to the LSP 420 in one transfer to reduce the number of round trip requests and transfers. By reducing the need for a round trip for every packet, the time required per packet to arrive at the LSP 420 is reduced. The faster the packets arrive at the proxy, the more packets will be transferred at a single cache fill request.

Figure 3:
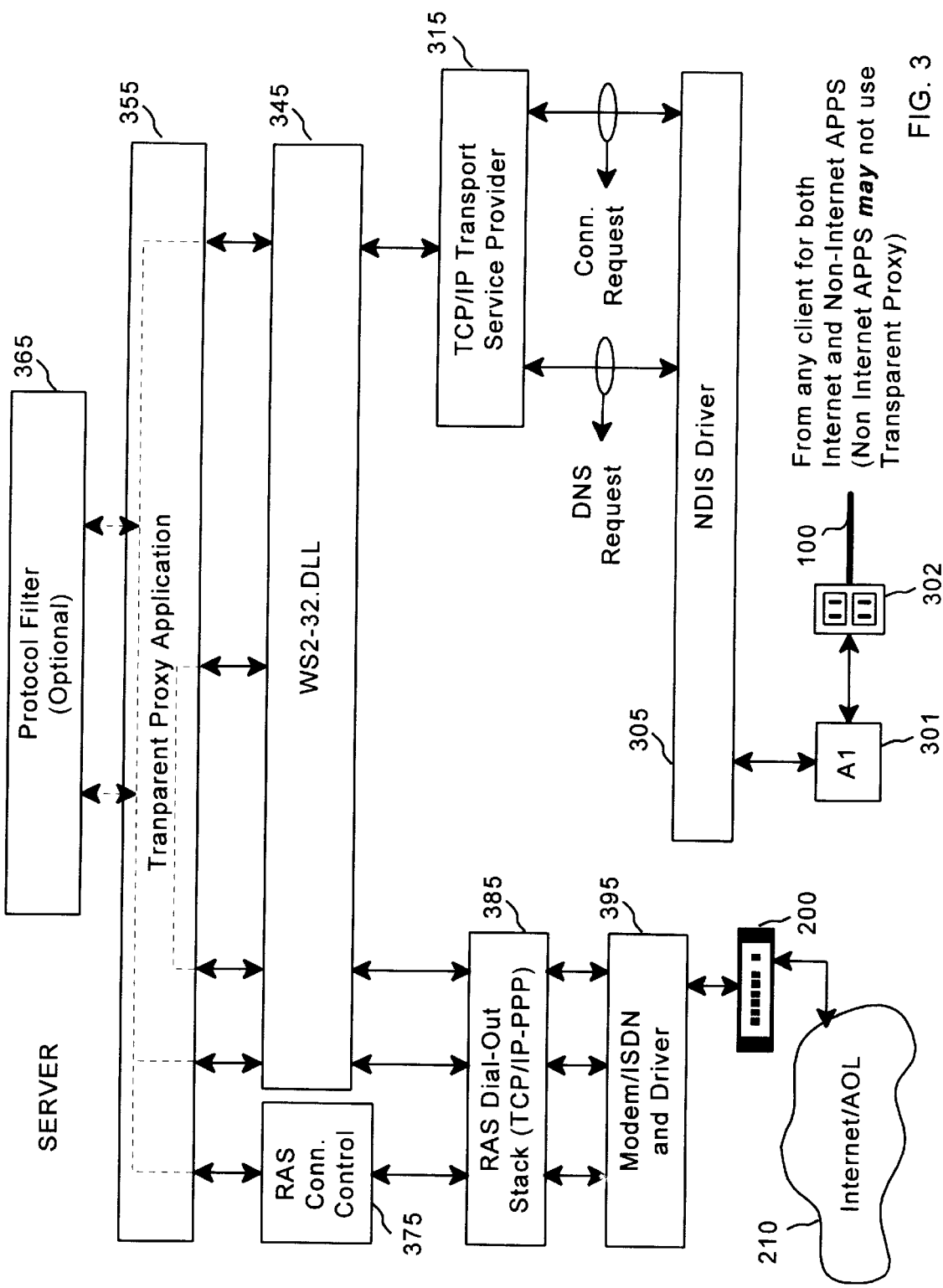
FIG. 3 is a more detailed block diagram of the software architecture of the server computer shown in FIG. 2.

FIG. 3 is a more detailed block diagram of the software architecture of the server PC 300 shown in FIG. 2. Requests for Internet data are received from the client PC over an AC power line 100 through an adapter 301 plugged into an AC outlet 302. The request is received in the server PC by the Network Device Interface Specification (NDIS) driver 305.

In addition to the transparent proxy application 355 and an optional protocol filter 365, the server PC uses a WinSock version 2.0 32-bit DLL (WS2-32.DLL) 345, which lets the transparent proxy application 355 interface with a TCP/IP transport service provider 315. The transport provider 315 enables communication between applications on the server PC and applications on remote networked computers.

The transparent proxy application 355 also controls a RAS connection control 375, a RAS dial-out stack 385 and a modem driver 395 which lets the server PC access the Internet 210 through a modem 200. Thus, when a request for data D1 to Dn is received by the NDIS driver 305, the transparent proxy application 355 can obtain the requested data from the Internet 210 and supply it to the client PC (not shown in FIG. 3).

Figure 4:
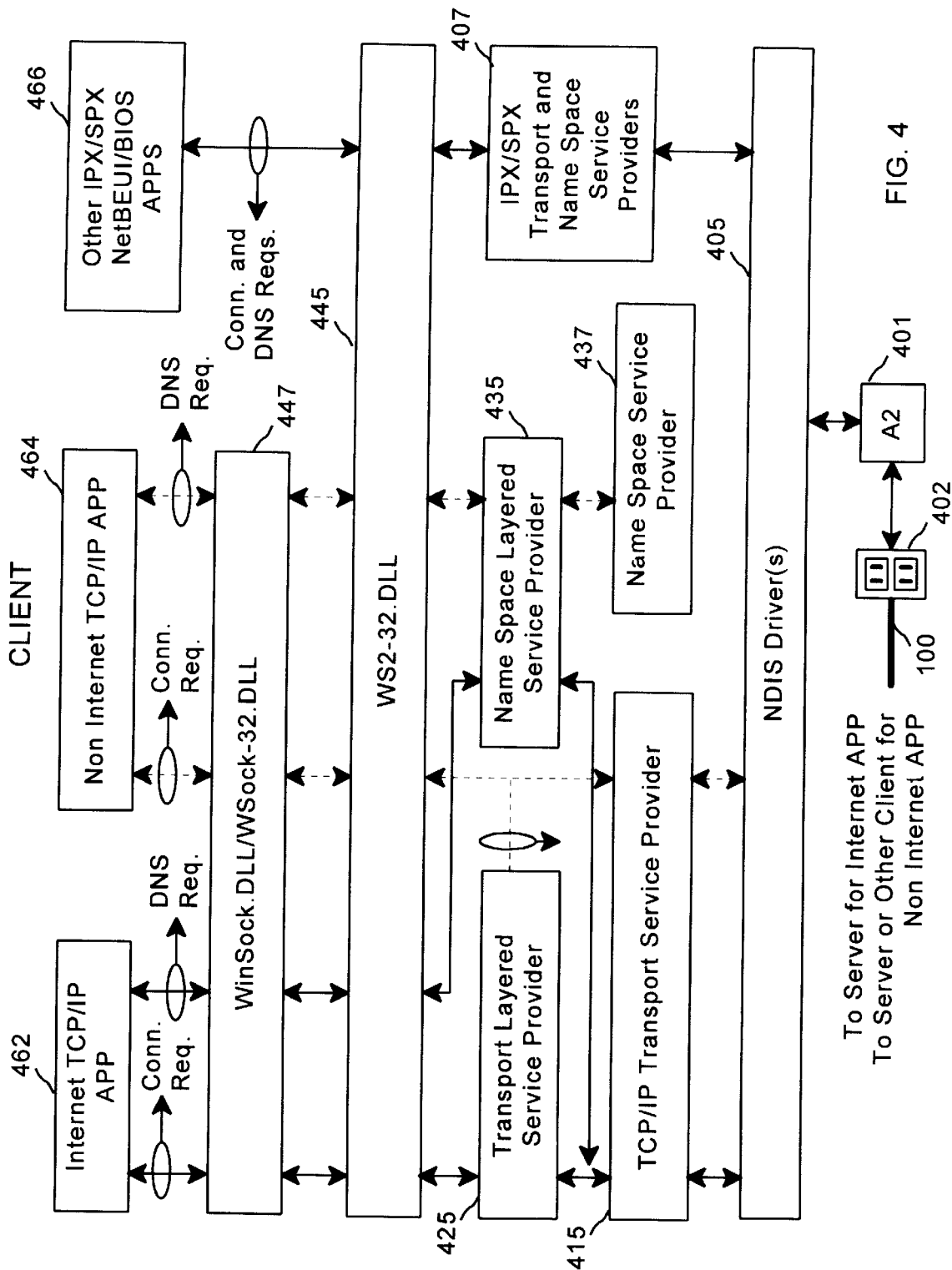
FIG. 4 is a more detailed block diagram of the software architecture of the client computer shown in FIG. 2.

FIG. 4 is a more detailed block diagram of the software architecture of the client PC 400 shown in FIG. 2. As shown in FIG. 4, the client PC can include an Internet application 462 and a non Internet application 464. These applications communicate through the WinSock related DLLs 445, 447. As with the server PC, these DLLs communicate with an NDIS driver 405 through a transport LSP 425, a name space LSP 435, a name space service provider 437 and a TCP/IP transport service provider 415.

The transport LSP 425 converts a request for Internet data D1 from the application 462 It into a request for data D1 to Dn. That is, the transport LSP 425 requests data in addition to the data D1 requested by the application 462. The request for data D1 to Dn is sent by the NDIS driver 405 to the server PC over an AC power line 100 using an adapter 401 plugged into an AC power outlet 402. When the data D1 to Dn is received from the server PC through the NDIS driver 405, the transport LSP 425 provides the data D1 to the Internet application 462, and stores the data D2 to Dn in a cache. When the application 462 asks for Internet data D2, the latency in the system is reduced because the data can quickly be given to the application from the cache. As is also shown in FIG. 4, other applications 466, such as a Network Basic Input/Output System (NetBIOS) or a NetBIOS Extended User Interface (NetBEUI), can communicate as usual with the NDIS driver 405 using an Internetwork Packet Exchange/Sequential Packet Exchange (IPX/SPX) transport and name space service providers 407, and these communications are not adversely affected by the present invention.

Figure 5:
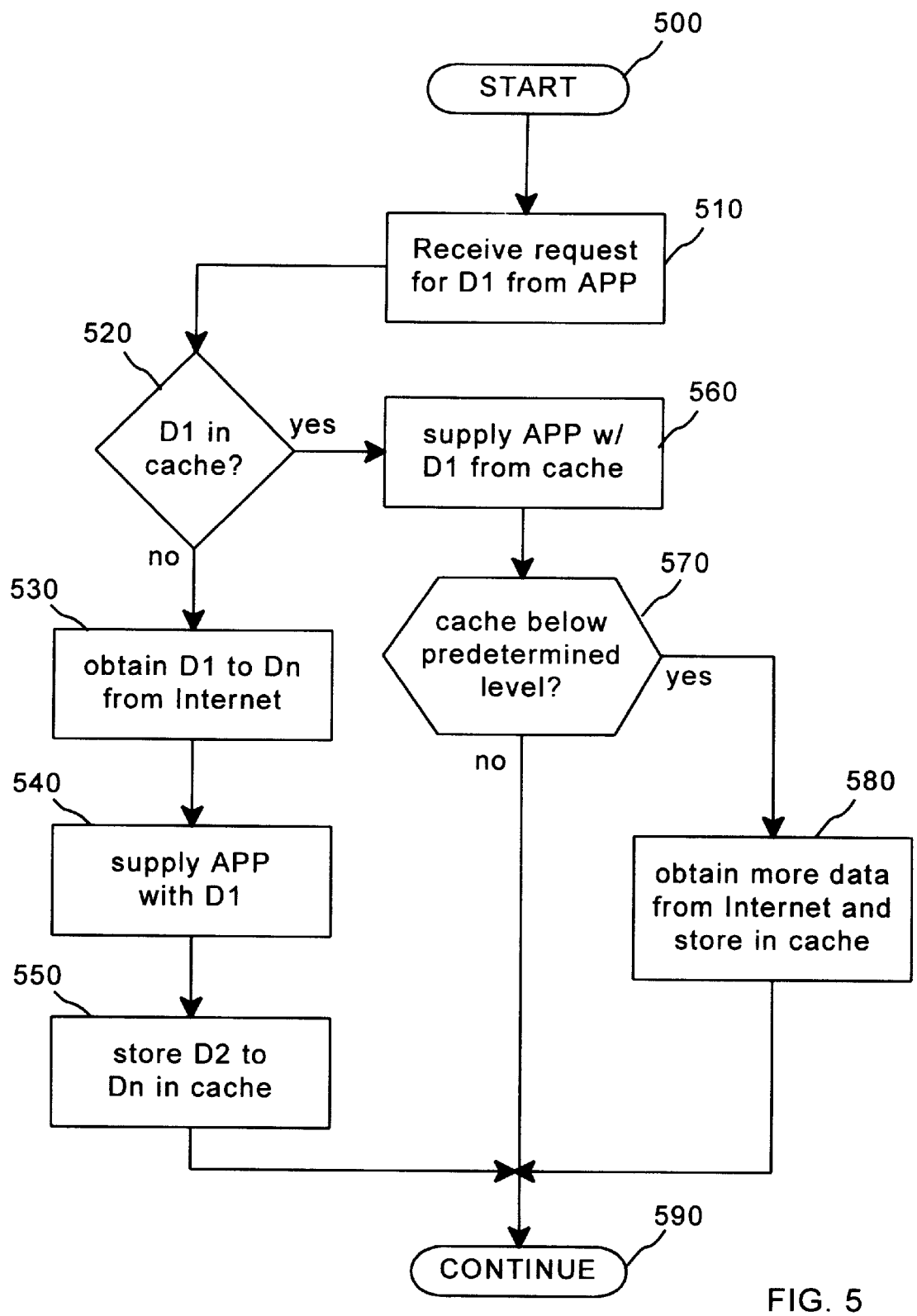
FIG. 5 is a flow diagram of a process suitable for practicing an embodiment of the present invention.

FIG. 5 is a flow diagram of a process suitable for practicing an embodiment of the present invention. After starting at step 500, a request for data D1 is received from an application such as RealAudio. If the requested data D1 is not already stored in the cache at step 520, data D1 to Dn are obtained from the Internet at step 530. The application is supplied with data D1, the data D2 through Dn are stored in the cache at steps 530 to 550, and the process continues at step 590.

If the requested data D1 is already stored in the cache at step 520, the data D1 is simply supplied to the application from the cache at step 560. Steps 570 and 580 represent the optional process of automatically pre-fetching data when the amount of data in the cache is below a predetermined level. If the amount of data in the cache is below a predetermined level at step 470, more data is obtained from the Internet and stored in the cache at step 580 before the process continues at step 590.

Although various embodiments are specifically illustrated and described herein, it will be appreciated that modifications and variations of the present invention are covered by the above teachings and within the purview of the appended claims without departing from the spirit and intended scope of the invention. For example, although data was pre-fetched by the LSP, it can be appreciated that any structure having this functionality falls within the scope of the invention. Further, although a network using an AC power line and a Windows 95 operating system is shown and described, it will be understood that other inter-computer networks and operating systems can be used instead. Finally, although specific algorithms are set forth for an embodiment of the invention, any algorithm or circuit implementing the functionality necessary for pre-fetching data with a proxy falls within the scope of the invention.

What is claimed is:

1. A method of requesting data over a network, comprising the steps of:
   receiving a request for a predetermined amount of application data from an application;
   converting said request to include an additional amount of pre-fetch application data;
   transmitting the request to a network proxy;
   receiving said predetermined amount of application data from the network proxy in response to said request;
   supplying said predetermined amount of application data to the application;
   receiving said additional amount of pre-fetch application data from the network proxy in response to said-request; and
   storing said additional amount of pre-fetch data;
   without modification of the application.

2. The method of claim 1, wherein the network is an AC power line network.

3. The method of claim 1, further comprising the steps of:
   receiving from the application a request for additional application data;
   determining if the requested additional application data has previously been obtained and stored as pre-fetch data; and
   supplying to the application the additional application data from the stored pre-fetch data if the additional application data has previously been obtained and stored as pre-fetch data.

4. The method of claim 3, further comprising the steps of:
   determining if the amount of stored pre-fetch data has fallen below said pre-determined amount; and
   requesting and receiving additional pre-fetch data from the network proxy if the amount of stored pre-fetch data has fallen below the pre-determined amount of pre-fetch data.

5. The method of claim 1, wherein the network proxy is a transparent proxy.

6. The method of claim 1, wherein said steps of receiving and requesting are performed using a WinSock transport layered service provider.

7. The method of claim 5, wherein the transparent proxy obtains the requested application data and pre-fetch data from the Internet.

8. The method of claim 6, wherein the network proxy performs steps comprising:
   receiving the request for application data from the WinSock transport layered service provider;
   issuing requests over a communications network to fetch the requested application data;
   receiving the requested application data from the communications network;
   forwarding the requested application data to the WinSock transport layered service provider;
   receiving additional pre-fetch application data from the communication network; and
   forwarding the additional pre-fetch application data to the WinSock transport layered service provider.

9. An apparatus for requesting data over a network, comprising:
   an application unit configured to generate an application data request;
   a client communications port configured to transmit the application data request and receive application data;
   a client layered service provider unit configured to:
      transmit the application data request through the client communications port;
      convert said application data request to include additional pre-fetch application data;
      receive said application data through the communications port, in response to said application data request;
      supply said application data to the application unit;
      receive said additional pre-fetch application data through the communications port, in response to said application data request; and
      store the pre-fetch data.

10. The apparatus of claim 9, further comprising:
a server communications port configured to receive the application data request from said client communications port;
a communications device coupled to a communications network; and
a transparent proxy unit coupled to said server communications port and said communications device and configured to:
receive the application data request from said server communications port;
issue requests through said communications device to fetch the requested application data;
receive the requested application data from the communications network through said communications device;
forward the requested application data to the client layered service provider unit through said server communications port;
receive additional pre-fetch application data from the communication network through said communications device; and
forward the additional pre-fetch applications data to the client layered service provider unit through said server communications port.

11. The system of claim 10, wherein the communications network is the Internet.

12. The system of claim 10, wherein said client layered service provider is implemented as a portion of a WinSock transport layered service provider.

13. The system of claim 10, wherein said server communications port receives the application data request from said client communications port over an AC power line network.

14. A computer readable medium having stored thereon instructions which, when executed by a processor, cause the processor to perform steps for requesting data over a network, said steps comprising:
receiving a request for a predetermined amount of application data from an application;
converting said request to include a predetermined amount of additional pre-fetch application data;
transmitting the request to a network proxy;
receiving said predetermined amount of application data from the network proxy in response to said request;
supplying said predetermined amount of application data to the application;
receiving said additional predetermined amount of pre-fetch application data from the network proxy in response to said request; and
storing said predetermined amount of pre-fetch data; without modification of the application.

15. The computer readable medium of claim 14, wherein the network is an AC power line network.

16. The computer readable medium of claim 14, wherein the instructions cause the processor to perform the further steps of:
receiving from the application a request for additional application data;
determining if the requested additional application data has previously been obtained and stored as pre-fetch data; and
supplying to the application the additional application data from the stored pre-fetch data if the additional application data has previously been obtained and stored as pre-fetch data.

17. The computer readable medium of claim 16, wherein the instructions cause the processor to perform the further steps of:
determining if the amount of stored pre-fetch data has fallen below said pre-determined amount of pre-fetch data; and
requesting and receiving additional pre-fetch data from the network proxy if the amount of stored pre-fetch data has fallen below the pre-determined amount.

18. The computer readable medium of claim 14, wherein the network proxy is a transparent proxy.

19. The computer readable medium of claim 14, wherein said steps of receiving and requesting are performed using a WinSock transport layered service provider.

20. The computer readable medium of claim 18, wherein transparent proxy obtains the requested application data and pre-fetch data from the Internet.

* * * * *

UNITED STATES PATENT AND TRADEMARK OFFICE
CERTIFICATE OF CORRECTION

PATENT NO. : 6,173,318 B1
DATED : January 9, 2001
INVENTOR(S) : Jeffrey R. Jackson; Scott B. Blum It is certified that error appears in the above-identified patent and that said Letters Patent is hereby corrected as shown below:

Column 2,
Line 37, "Pentium®, Pro" should be -- Pentium® Pro --

Column 5,
Line 2, "462 It" should be -- 462 --

Column 6,
Line 2, "said-request" should be -- said request --

Signed and Sealed this

Twenty-sixth Day of February, 2002

*Attest:*

JAMES E. ROGAN
*Attesting Officer*           *Director of the United States Patent and Trademark Office*